United States Patent [19]

Graafland et al.

[11] Patent Number: 5,837,769

[45] Date of Patent: Nov. 17, 1998

[54] FREE FLOWING ELASTOMER POWDER

[75] Inventors: Tenunis Graafland; Peter Migchels, both of Louvain-La-Neuve, Belgium

[73] Assignee: Shell Oil Company, Houston, Tex.

[21] Appl. No.: 566,651

[22] Filed: Dec. 4, 1995

Related U.S. Application Data

[62] Division of Ser. No. 363,439, Dec. 22, 1994, abandoned.

[30] Foreign Application Priority Data

Dec. 22, 1993 [EP] European Pat. Off. ............ 93203636.1

[51] Int. Cl.⁶ ...................................................... C08L 53/00
[52] U.S. Cl. .............................................. 524/505; 428/95
[58] Field of Search ................................. 524/505; 428/95

[56] References Cited

U.S. PATENT DOCUMENTS

| | | | |
|---|---|---|---|
| 3,985,702 | 10/1976 | Himes | 524/505 |
| 4,060,510 | 11/1977 | Himes | 260/33.6 |
| 4,163,031 | 7/1979 | Hannon et al. | |
| 4,171,056 | 10/1979 | Hannon et al. | |
| 4,325,770 | 4/1982 | Korpman | |

OTHER PUBLICATIONS

European Search Report Dated Mar. 3, 1995.

*Primary Examiner*—Peter D. Mulcahy

[57] ABSTRACT

The present invention is a free flowing powder composition which contains an elastomeric block copolymer and significant amounts of a plasticizing oil. The powder forms a homogeneous layer and is suitably applied as a carpet backing.

5 Claims, No Drawings

FREE FLOWING ELASTOMER POWDER

This is a division of application Ser. No. 08/363,439, filed Dec. 22, 1994, now abandoned.

FIELD OF THE INVENTION

The present invention relates to a free flowing powder composition, to a process for the preparation thereof and to homogeneous layers derived therefrom.

BACKGROUND OF THE INVENTION

Up to now rubber latexes are widely used in for instance the carpet industry as backing for carpets as well as in the paper and board industry for coating purposes. However, the use of such rubber latexes, i.e. a dispersion of a thermoplastic rubber in an organic solvent, are undesired from an environmental point of view due to the evaporation of organic solvent and due to the fact that recycling of latexes is not possible. Hence, there is a need for suitable, environmentally friendly alternatives for rubber latexes.

U.S. Pat. No. 4,163,031 discloses a powder composition useful for coating applications comprising a blend of 25 to 90% by weight of a selectively hydrogenated block copolymer and 75 to 10% by weight of one or more aromatic melt flow modifiers which are at least partially hydrogenated to remove the aromatic character thereof. The block copolymer comprises monovinyl arene endblocks and at least partially hydrogenated conjugated diene midblock(s) and has a monovinyl arene content of from 5 to 50% by weight. The powder composition may further contain up to 8% by weight of a silicon containing adhesion promoter. The '031 patent further discloses a process for preparing such powder composition comprising the subsequent steps of melt blending the components, followed by cooling, pelletizing the composition and pulverizing, e.g. by cryogenic grounding, the pellets to the desired pellet size.

U.S. Pat. No. 4,325,770 discloses a process for preparing pressure sensitive adhesive coated products, wherein a thermoplastic elastomer and a tackifying resin are separately pulverized, after which the powders thus obtained are dry-blended at ambient temperature. The powder blend thus obtained is dry coated onto the surface of a substrate and the powder coated substrate subsequently is heated, thus allowing the powder particles to melt together to form a homogeneous coating. Finally, the coating is cooled to ambient temperature. The thermoplastic elastomer employed is an ABA type block copolymer with A being a poly(alkenyl arene) blocks and B a poly(conjugated diene) block. Pulverizing of this block copolymer takes place at temperatures below $-20°$ C., preferably below $-50°$ C.

Both U.S. patents discussed above disclose methods of preparing powders containing elastomeric block copolymers. However, none of the powders disclosed contain any plasticizer oil, as a result of which the coatings prepared from these powders are rather rigid, which makes them unsuitable for applications requiring flexible and elastic coatings or layers, such as e.g. in carpet backings, conveyor belts, bottle cap seals, underbody car coatings and rubberized textiles, fabrics, paper or board. Up to know it was generally believed that plasticizer oils could not be part of a free flowing powder composition containing an elastomeric block copolymer, since the oil would cause the individual powder particles to adhere to one another, thus making it very difficult to handle the powder. Moreover, storage of a powder already containing oil was believed to be in fact impossible. Therefore, the normal procedure was to prepare a free flowing powder of block copolymer, possibly together with some other non-tacky components, and to add the oil only at the moment the powder was to be processed, thus avoiding agglomeration problems arising during storage. Also for reasons of expected coagulation problems, simultaneously pulverizing elastomeric polymers on the one hand and plasticizing oils and/or tackifying resins on the other hand, was avoided. This is illustrated by U.S. Pat. No. 4,325,770, where block copolymer and tackifying resin are separately pulverized before being dry-blended. Accordingly, it would be very advantageous from a processing and a cost perspective if a stable and storable, free flowing powder composition would be available containing an elastomeric polymer as well as a plasticizing oil.

The present invention aims to provide such stable, free flowing powder composition containing both elastomeric polymer and plasticizing oil, which composition can be stored without problems. Furthermore, it is an object of the present invention to provide a free flowing powder composition, which can be suitably applied for preparing flexible and elastic homogeneous layers. Still a further object of the present invention is to provide a process for the preparation of a stable, free flowing powder composition, which process can easily be carried out and is economically attractive. Finally, it is an object of the present invention to provide a homogeneous layer obtainable from the free flowing powder composition, which layer can suitably be applied as a carpet backing.

SUMMARY OF THE INVENTION

The present invention is a free flowing powder composition which contains an elastomeric block copolymer and significant amounts of a plasticizing oil. The powder forms a homogeneous layer and is suitably applied as a carpet backing.

DETAILED DESCRIPTION OF THE INVENTION

The present invention includes a free flowing powder composition with a particle size of 800 $\mu$m or less comprising:

(a) 100 parts by weight of based on the total weight of the powder composition a block copolymer comprising at least one poly(monovinyl aromatic hydrocarbon) block and at least one hydrogenated or unhydrogenated poly (conjugated diene) block and having a monovinyl aromatic hydrocarbon content in the range of from 10 to 60% by weight, preferably 15 to 35% by weight, based on total weight of block copolymer;

(b) 50 to 200, preferably 100 to 150, parts by weight of based on the total weight of the powder composition plasticizing oil;

(c) 50 to 200, preferably 70 to 110, parts by weight of based on the total weight of the powder composition a poly(monovinyl aromatic hydrocarbon) block compatible resin; and (d) 0.1 to 10% by weight, preferably 1 to 5% by weight, based on total weight of composition of a dusting agent.

With the expression "free flowing powder composition" us used throughout this specification is meant a powder of which the particles consist of a composition containing at least the components (a) to (d) as defined above and of which the particles do not adhere to one another.

The size of the powder particles is expressed in terms of the particle's diameter. In general, this size is determined by sieving and is independent of the shape of the particle. The particle size should always be 800 μm or less and is primarily determined by the desired end-use.

For instance, if the powder is to be used for making a thin, smooth coating, the particle size should be relatively small, i.e. in the range of from 100 to 250 μm, while in this case a small particle size distribution is highly preferred. On the other hand, if the powder is to be used for preparing a thicker layer or coating whereby the smoothness of the surface is not particularly critical, such as for instance a carpet backing, the powder particles do not need to be very small, while the particle size distribution is not particularly critical. In this case the particle size may suitably lie within the range of from 200 to 700 μm.

In general, the particle size for most applications preferably lies between 100 and 700 μm and even more preferably between 150 and 600 μm.

The block copolymer used in principle may be any block copolymer comprising at least one poly(monovinyl aromatic hydrocarbon) block and at least one hydrogenated or unhydrogenated poly(conjugated diene) block. If good heat-ageing resistance, weatherability and resistance to oxidation is desired, the selectively hydrogenated block copolymers are preferred. This may for instance be desired when recycling of the final product by means of heating is foreseen. On the other hand, unhydrogenated block copolymers may be preferred for less demanding applications.

The block copolymer may have a linear, radial or star-shaped structure. One preferred type of block copolymer however, is a linear block copolymer comprising two poly(monovinyl aromatic hydrocarbon) endblocks and one poly(conjugated diene) midblock.

Another preferred type of block copolymer is a radial block copolymer of the general formula $$(AB)_n(B)_mX$$

wherein A is a poly(monovinyl aromatic hydrocarbon) block, B is a poly(conjugated diene) block, X is a coupling agent residue and n and m are integers of from 0 to 30. Apart from the main monomer, polymer blocks A and B may contain small amounts, i.e. up to 20% by weight but preferably less than 10% by weight based on the total weight of the block copolymer, of one or more other monomers which are copolymerizable with the said main monomer.

Other suitable types of block copolymers are those containing homopolymeric blocks as well as tapered polymer blocks, i.e. polymer blocks containing both monovinyl aromatic hydrocarbon and conjugated diene wherein the content of one of these monomers gradually increases in one direction. Also mixtures of different block copolymers may be used, for instance an AB/ABA block copolymer mixture with A and B as defined above. For all types of block copolymers it is preferred that the poly(monovinyl aromatic hydrocarbon) block is a polystyrene block and the poly(conjugated diene) block is a polybutadiene or polyisoprene block.

The apparent molecular weight of the block copolymer, i.e. the molecular weight as determined by gel permeation chromatography using polystyrene calibration standards, may vary over a broad range and suitably lies within the range of from 25,000 to 1,000,000, preferably 50,000 to 500,000. In the event of branched or star-shaped block copolymers the apparent molecular weight may even exceed 1,000,000.

In general, the block copolymers may be produced by any well known polymerization process, such as e.g. disclosed in U.S. Pat. Nos. 3,322,856; 3,231,635; 4,077,893; 4,219,627; and 4,391,949.

Examples of commercially available block copolymers, which may be used in the powder composition according to the present invention, include CARIFLEX TR-1101, CARIFLEX TR-1102 (both linear styrene-butadiene-styrene block copolymers) and CARIFLEX TR-1107 (a linear styrene-isoprene-styrene block copolymer. CARIFLEX is a trade mark. An example of a suitable styrene-isoprene multi-armed block copolymer is KRATON D-1320X (KRATON is a trade mark). Examples of commercially available selectively hydrogenated block copolymers are KRATON G 1650, 1651, and 1652 (all linear styrene-ethylene/butylene-styrene block copolymers).

Mineral oils, both naphthenic and paraffinic oils, or low molecular weight polybutylene polymers may be used as the plasticizing oil. Examples of suitable plasticizers are SHELLFLEX 371 and 451, CATENEX 956 and TUFFLO 6204 (naphthenic oils), TUFFLO 6056 (paraffinic oil) and the polybutylenes HYVIS 200, NAPVIS 30 and NAPVIS D-10. SHELLFLEX, CATENEX, TUFFLO, HYVIS and NAPVIS are trademarks. Also very useful are poly-α-olefin based products, such as e.g. ETHYLFLO (ETHYLFLO is a trade mark), as well as other commercially available plasticizers, such as REGALREZ 1018 (REGALREZ is a trademark), ONDINA 68 (ONDINA is a trade mark) and V-OIL 7047 (V-OIL is a trade mark). The plasticizer is preferably in amounts of from 50 to 200 phr, more preferably 100 to 150 phr. The abbreviation "phr" stands for parts by weight per 100 parts by weight of rubber, i.e. block copolymer.

The plasticizing oil is essential for obtaining a powder which, after fusion of the powder particles upon exposure to heat, results in a homogeneous layer having a smooth surface.

As the poly(monovinyl aromatic hydrocarbon) compatible resin, commonly referred to as endblock compatible resin, any resin known to be applicable for this purpose may be used. Particularly suitable endblock compatible resins include low molecular weight resins, largely derived from alpha-methylstyrene. An example of such resin, which is commercially available, is KRISTALEX 3115 (formerly KRISTALEX F-120; KRISTALEX is a trade mark). Other examples include coumarone-indene resins, phenol-aldehyde resins and aromatic resins in general. The endblock compatible resin is used in an amount of from 50 to 200 phr and preferably in an amount of from 70 to 120 phr.

The dusting agent is very fine powder, i.e. a powder of which the average particle size lies between 1 nm and 100 μm, preferably between 5 nm and 10 μm. In principle any such fine powder may be employed, but it is preferred that silica or calcium carbonate powder is used. Examples of commercially available silica powders are AEROSIL R972 (average particle size about 16 nm), AEROSIL 200 (average particle size about 12 nm), SIPERNAT, DUROSIL, DUREX and ULTRASIL. DURCAL 5 (average particle size 6 μm) and MILLICARB (average particle size 3 μm) are examples of commercially available calcium carbonate powders. AEROSIL, SIPERNAT, DUROSIL, DUREX, ULTRASIL, DURCAL and MILLICARB are trade marks. The dusting agent is used in an amount of from 0.1 to 10% by weight, preferably from 1 to 5% by weight, based on total weight of composition.

In addition to the components described above, the free flowing powder composition of the present invention may further comprise up to 500 phr, preferably from 50 to 300 phr and more preferably from 100 to 250 phr, of a filler. As the filler any filler material known in the art may be used. Hence, suitable fillers include calcium carbonate, aluminum silicate, clays, talcs, silica and the like. Also very useful are reground polymeric waste, such as e.g. vulcanized rubber powder, recycled polyurethane or recycled carpets. Calcium carbonate, aluminum oxide (alumina), magnesium hydroxide, barium sulphate and silica are particularly useful as the filler material. Of these, calcium carbonate and silica are most preferred.

The free flowing powder composition of the present invention may also contain a blowing agent. The presence of a blowing agent in the final free flowing powder composition may be desired if the powder composition is to be applied as a carpet backing. If the carpet backing should be soft and elastic, than it is common practice in the carpet industry that a foamed or blown carpet backing is used. In order to realize such foamed or blown carpet backing the presence of a blowing agent in the carpet backing composition is required. Normally, a blowing agent decomposes above a certain temperature thereby releasing gas, such as e.g. nitrogen, which causes a volume increase of the reaction mass. The temperature at which the blowing agent starts decomposing is further referred to as the activation temperature. Generally known blowing agents are for instance azodicarbonamide-based compounds and diphenyloxide-4, 4'-disulphohydrazide. The latter is commercially available under the trade name GENITRON OB (GENITRON is a trade mark), while the azodicarbonamide-based compounds are commercially available as GENITRON EPE, EPA and EPB. If present at all, the blowing agent may be present in the free flowing powder composition in amounts up to 3% by weight, preferably from 0.2 to 3% by weight, more preferably from 0.5 to 2.5% by weight based on the total weight of composition.

In addition to the components described above, other conventional ingredients such as antioxidants, UV stabilizers, slipping agents, flame retarders and the like may be present as well. Such ingredients are only present in small quantities, i.e. up to 2% by weight based on the total weight of composition. In this respect it is noted that several inorganic filler materials listed above also may have flame retarding properties and hence may be present in larger quantities than 2% by weight.

The present invention further relates to a process for the preparation of the free flowing powder composition as hereinbefore described, said process comprising the steps of:

(a) melt blending all components present in the free flowing powder composition except the dusting agent and the blowing agent, if present, followed by cooling;

(b) granulating or pelletizing the composition resulting from step (a);

(c) cryogenically milling the granules or pellets resulting from step (b); and (d) dry-blending the dusting agent and optionally the blowing agent with the powder resulting from step (c).

Up to now it was considered impossible to cryogenically mill a composition containing monovinyl aromatic-conjugated diene block copolymers as well as components which soften the block copolymer, such as plasticizing oils and tackifying resins. It was generally believed that due to the presence of oil, the powder particles would be unstable and would tend to adhere to one another, thus making it very difficult to obtain a stable, free flowing powder which could be stored for longer periods of time. Surprisingly, it has now been found that it is possible to obtain a stable, free flowing powder of a composition containing both block copolymer and oil. In order to obtain such stable powder it is essential that after the cryogenic milling a dusting agent is added. Without being bound to any particular theory, it is believed that the very fine, dusting agent particles are attached to the surface of the powder particles resulting from the cryogenic milling, thus preventing these powder particles from adhering to one another.

Cryogenic milling of the granules or pellets resulting from step (b) may be performed through the conventional cryogenic milling techniques, wherein for instance liquid nitrogen often is used as the chilling medium. For less smaller particles, the said granules or pellets may also be cryogenically milled using liquid carbon dioxide or freon as the chilling medium.

The free flowing powder of the present invention can be used to form a homogeneous layer having a smooth surface. In order to obtain such layer, the dry free flowing powder should first be brought onto a suitable underground as a layer. Upon exposure to heat, the powder particles then fuse and a homogeneous layer is formed. If a foamed layer is desired, a blowing agent is necessary. As already indicated supra, a blowing agent decomposes above its activation temperature. Since the components constituting the powder composition are first melt-blended, i.e. blended at an elevated temperature above the melting temperatures of the components, the blowing agent is only added in powder form after the cryogenic milling and is simply dry-blended with the powder resulting from the cryogenic milling. Otherwise, it would already decompose during the melt-blending step. Thus, if a blowing agent is present in the final powder and this powder is heated to a sufficiently high temperature, fusing of the powder particles and foaming will simultaneously occur and a foamed layer will be formed. In this case the density of the layer will be lower than in the event no blowing agent is used. If a blowing agent is present in the powder composition, a homogeneous layer having a density as low as 0.5 $g/cm^3$ can be obtained. This is extremely low for compositions containing elastomeric block copolymers and oil. Accordingly, the present invention also embraces homogeneous layers obtainable by fusing the free flowing powder composition described above.

Preferably, the fusing of the free flowing powder composition is realized by heating a layer of the composition. A preferred method of heating is subjecting the unfused powder composition to infra-red radiation. However, other heating methods, such as flame-spraying or contacting hot objects with the powder thus establishing fusion of the powder particles at the surface of the said object, may be applied as well. Fluidized bed and slush moulding techniques are very useful in the latter heating method.

It will be understood that a carpet, of which the carpet backing consists of a homogeneous layer derived from the free flowing powder composition, as well as other shaped articles containing a layer of the fused free flowing powder composition, also form part of the present invention.

The invention is further illustrated by the following examples.

EXAMPLE 1

A composition consisting of:
100 parts by weight (pbw) KRATON G-1652 elastomer
140 pbw of oil (PRIMOL 352)
100 pbw KRISTALEX 3115 endblock compatible resin
200 pbw of calcium carbonate filler (DURCAL 5)
1 pbw of antioxidant (IRGANOX 1010) and
1 pbw of slipping agent (KEMAMIDE E)
was prepared by dry-blending the components and subsequently extruding the blend thus obtained in a twin screw extruder with temperature settings between 140° and 190°

C. The composition was allowed to cool and was subsequently granulated.

DURCAL, IRGANOX and KEMAMIDE are trademarks in addition to the earlier described trademarks.

The granulated composition was then cryogenically milled in an ALPINE 160 UPZ Fine Impact Mill. The granules were first embrittled by putting them into a bath of liquid nitrogen and were then passed through the mill which was cooled to −95° C. This resulted in a powder of which 98.2% by weight had a particle size below 500 μm and 88.7% by weight a particle size below 315 μm (determined with an ALPINE Air Jet Sieve 200 LS). After drying the powder for 60 minutes without heating in a RETSCH Polymer Drier a fine powder was obtained.

Then 11 pbw (about 2% by weight) of dusting agent was subsequently added and admixed with the powder. The resulting free flowing powder was stable and showed no fusion of powder particles, even after having been stored for 8 weeks.

The free flowing agent was formed into a sheet and was heated in an oven under vacuum at 180° C. for 10 minutes to form coherent sheets with smooth surfaces. Dumbbells were cut out of these sheets in order to measure the mechanical properties. Tensile strength and Elongation at Break were determined according to ASTM D 412. Crosshead speed was 500 mm/min.

The results are:

Tensile strength: 1.8 MPa

Elongation at Break: 240%

Modulus 100%: 1.2 MPa

Shore A Hardness (0 s): 53.5

Shore A Hardness (23 s): 49.5

EXAMPLE 2

A free flowing powder composition consisting of:

100 parts by weight (pbw) KRATON G-1652 elastomer 140 pbw of paraffinic oil (CATENEX 956)

100 pbw KRISTALEX 3115 endblock compatible resin 200 pbw of calcium carbonate filler 11 pbw of dusting agent (AEROSIL 200)

1 pbw of antioxidant (IRGANOX 1010) and 1 pbw of slipping agent (KEMAMIDE E)

was prepared in the same way as described in Example 1. The free flowing powder was stable and showed no fusion of powder particles, even after having been stored for 8 weeks.

The dry powder was applied in a layer of 400 g/m² to the back side of a tufted polypropylene carpet and treated for approximately 45 seconds by means of infra-red heating. After cooling a flexible backing having a smooth surface was obtained, which backing also showed good tuft anchoring.

EXAMPLE 3

A free flowing powder composition consisting of:

100 pbw of CARIFLEX TR-1102 elastomer 140 pbw of paraffinic oil (CATENEX 956)

100 pbw KRISTALEX 3115 endblock compatible resin 200 pbw of calcium carbonate filler 11 pbw of dusting agent (AEROSIL 200)

1 pbw of antioxidant (IRGANOX 1010) and 1 pbw of slipping agent (KEMAMIDE E)

was prepared in the same way as described in Example 1, except that in together with the dusting agent 11 pbw of blowing agent (GENITRON EPE) was added. The free flowing powder was stable and showed no fusion of powder particles, even after having been stored for 8 weeks.

The dry powder was shaped into a layer of 1200 g/m² and heated at 190°–200° C. for 5 minutes in an oven. The result was a nicely fused and foamed, micro-cellular sheet having a density of 0.5 g/cm³.

We claim:

1. A process for the preparation of a carpet backing composition, comprising the steps of:

melt blending 100 parts by weight based on the total weight of blending components of a block copolymer, from 50 to 200 parts by weight based on the total weight of blending components of plasticizing oil, and from 50 to 200 parts by weight based on the total weight of blending components of a poly(monovinyl aromatic hydrocarbon) block compatible resin, wherein the block copolymer comprises at least one poly(monovinyl aromatic hydrocarbon) block, at least one hydrogenated or unhydrogenated poly(conjugated diene) block, and a monovinyl aromatic hydrocarbon content in the range of from 10 to 60% by weight based on the total weight of the block copolymer;

granulating or pelletizing the blended components;

cryogenically milling the granules or pellets into a powder; and dry-blending a dusting agent and optionally a blowing agent with the powder.

2. The process of claim 1, further comprising the step of fusing the dry-blended composition into a homogeneous layer.

3. The process of claim 2, wherein the fusing of the dry-blended composition is realized by heating a layer of the composition.

4. The process of claim 2, wherein the fusing of the dry-blended composition is realized by subjecting the unfused composition to infra-red radiation.

5. The process of claim 2, wherein the homogeneous layer is a carpet backing.

* * * * *